United States Patent
Wipf et al.

(10) Patent No.: US 10,479,616 B2
(45) Date of Patent: Nov. 19, 2019

(54) TRANSPORT DEVICE FOR TRANSPORTING AT LEAST ONE PRODUCT, IN PARTICULAR FOR FORMING ROWS AND/OR GROUPS OF PRODUCTS

(71) Applicant: Robert Bosch GmbH, Stuttgart (DE)

(72) Inventors: Alfred Wipf, Jestetten (DE); Philipp Kathan, Schaffhausen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/919,696

(22) Filed: Mar. 13, 2018

(65) Prior Publication Data
US 2018/0257871 A1   Sep. 13, 2018

(30) Foreign Application Priority Data

Mar. 13, 2017  (DE) .................. 10 2017 204 051

(51) Int. Cl.
| | |
|---|---|
| *B65G 47/28* | (2006.01) |
| *B65G 17/24* | (2006.01) |
| *B65G 17/42* | (2006.01) |
| *B65G 47/26* | (2006.01) |

(52) U.S. Cl.
CPC ............. *B65G 47/28* (2013.01); *B65G 17/24* (2013.01); *B65G 17/42* (2013.01); *B65G 47/268* (2013.01); *B65G 2811/0631* (2013.01)

(58) Field of Classification Search
CPC .................................................. B65G 47/28
USPC ........................................................ 198/779
See application file for complete search history.

(56) References Cited

U.S. PATENT DOCUMENTS

| | | | |
|---|---|---|---|
| 7,311,192 B2 | 12/2007 | Fourney | |
| 8,225,922 B1* | 7/2012 | Fourney | B65G 17/24 198/370.09 |
| 9,834,402 B2* | 12/2017 | Sachs | B65B 57/14 |
| 2014/0332376 A1* | 11/2014 | Shah | H01J 37/3455 204/298.16 |
| 2015/0068866 A1 | 3/2015 | Fourney | |
| 2016/0251169 A1 | 9/2016 | Stefanko | |

FOREIGN PATENT DOCUMENTS

| | | |
|---|---|---|
| JP | S5746513 U | 3/1982 |
| WO | 2014066607 A1 | 5/2014 |

* cited by examiner

Primary Examiner — Saul Rodriguez
Assistant Examiner — Lester Ill Rushin
(74) Attorney, Agent, or Firm — Michael Best & Friedrich LLP (57) ABSTRACT

A transport device for transporting at least one product (12*a*; 12*b*), with at least one guide unit (14*a*; 14*b*), with at least one conveyor unit (16*a*; 16*b*), which has at least one continuous conveyor unit (18*a*; 18*b*) mounted movably relative to the guide unit (14*a*; 14*b*), which comprises at least one movably mounted conveyor element (20*a*; 20*b*), and at least one further movably mounted conveyor element (22*a*; 22*b*), which are connected to each other to form the continuous conveyor unit (18*a*; 18*b*) and are at least jointly movable relative to the guide unit (14*a*; 14*b*), and with at least one conveyor drive unit (24*a*; 24*b*) for driving the continuous conveyor unit (18*a*; 18*b*) relative to the guide unit (14*a*; 14*b*), in particular for driving the continuous conveyor unit (18*a*; 18*b*) in rotation about the guide unit (14*a*; 14*b*).

22 Claims, 8 Drawing Sheets

TRANSPORT DEVICE FOR TRANSPORTING AT LEAST ONE PRODUCT, IN PARTICULAR FOR FORMING ROWS AND/OR GROUPS OF PRODUCTS

BACKGROUND OF THE INVENTION

The invention relates to a transport device and method for transporting at least one product, in particular for forming rows and/or groups of products.

U.S. Pat. No. 7,311,192 B2 already discloses a transport device for transporting at least one product, which transport device comprises at least one guide unit and at least one conveyor unit, which has at least one continuous conveyor unit mounted movably relative to the guide unit, which comprises at least one movably mounted conveyor element and at least one further movably mounted conveyor element which are connected to each other to form the continuous conveyor unit and are at least jointly movable relative to the guide unit. The known transport device moreover comprises at least one conveyor drive unit for driving the continuous conveyor unit relative to the guide unit, in particular for driving the continuous conveyor unit in rotation about the guide unit.

SUMMARY OF THE INVENTION

The invention starts out from a transport device for transporting at least one product, in particular for forming rows and/or groups of products, with at least one guide unit, with at least one conveyor unit, which has at least one continuous conveyor unit mounted movably relative to the guide unit, in particular an endless conveyor roller transport belt, which comprises at least one movably mounted conveyor element, in particular a conveyor roller, and at least one further movably mounted conveyor element, in particular a further conveyor roller, which are connected to each other to form the continuous conveyor unit and are at least jointly movable relative to the guide unit, and with at least one conveyor drive unit for driving the continuous conveyor unit relative to the guide unit, in particular for driving the continuous conveyor unit in rotation about the guide unit.

It is proposed that the transport device comprises at least one individual drive unit which is provided at least to individually drive at least the at least one conveyor element and/or the at least one further conveyor element, in particular in addition to driving of the continuous conveyor unit relative to the guide unit by means of the conveyor drive unit. The individual drive unit is preferably provided at least to drive the at least one conveyor element and/or the at least one further conveyor element independently of the conveyor drive unit. The individual drive unit is preferably provided at least to drive the at least one conveyor element and the at least one further conveyor element independently of each other, in particular in addition to driving of the continuous conveyor unit relative to the guide unit by means of the conveyor drive unit. The individual drive unit is preferably provided to drive the at least one conveyor element and/or the at least one further conveyor element actively or passively. The individual drive unit is preferably provided to superpose a driving movement of the at least one conveyor element and/or of the at least one further conveyor element on a driving movement of the continuous conveyor unit relative to the guide unit. The individual drive unit preferably has at least one electric motor unit which is provided at least to drive the at least one conveyor element and/or the at least one further conveyor element in rotation. The individual drive unit can alternatively or additionally have another motor unit, deemed appropriate by a person skilled in the art, for driving the at least one conveyor element and/or the at least one further conveyor element, for example a magnetic drive unit, an eddy current drive unit, a compressed air drive unit or the like. "Provided" is to be understood in particular as meaning specially programmed, configured and/or equipped. Where an object is provided for a defined function, this is to be understood in particular as meaning that the object fulfils and/or performs this defined function in at least one use state and/or operating state.

A "continuous conveyor unit" is to be understood in particular as a unit which is provided to generate a continuous product stream, wherein in particular at least one transport speed, at which products are transportable, and/or one transport direction, along which products are transportable, are/is adjustable. The continuous conveyor unit can preferably be operated at different speeds. The transport device preferably comprises at least one controlling and/or regulating unit, which is provided at least to control, regulate and/or change at least a speed of the continuous conveyor unit, to start or stop an operation of the continuous conveyor unit, or similar. The continuous conveyor unit is preferably designed as an endless conveyor roller transport belt which is formed at least of the at least one conveyor element and the at least one further conveyor element, in particular on account of a chain-like juxtaposition of the at least one conveyor element and the at least one further conveyor element. The continuous conveyor unit preferably has a multiplicity of conveyor elements, in particular conveyor rollers, which are connected to each other to form the continuous conveyor unit designed as an endless conveyor roller transport belt. However, it is also conceivable that the continuous conveyor unit is designed in an alternative embodiment as an endless conveyor transport belt which has a multiplicity of endless conveyor belt segments connected to each other, in particular like a chain. The conveyor belt segments are preferably themselves designed as endless conveyor belts which can be driven in rotation by means of the at least one conveyor element and/or the at least one further conveyor element, in particular in addition to driving of the continuous conveyor unit in rotation. The continuous conveyor unit preferably has a maximum width, in particular a maximum width transverse to, in particular at least substantially perpendicular to, a main transport direction of the continuous conveyor unit, measuring in particular greater than 790 mm, preferably greater than 900 mm, and particularly preferably less than 2000 mm. The expression "substantially perpendicular" is here intended in particular to define an orientation of a direction relative to a reference direction, wherein the direction and the reference direction, particularly when viewed in one plane, enclose an angle of 90°, and the angle has a maximum deviation of in particular less than 8°, advantageously less than 5° and particularly advantageously less than 2°.

The continuous conveyor unit is preferably provided to convey products along the main transport direction of the continuous conveyor unit, as a result of a rotating drive of the continuous conveyor unit relative to the guide unit. Products are preferably conveyed by a rotating drive of the continuous conveyor unit by means of the conveyor drive unit. Products can also conceivably be conveyed along the main transport direction of the continuous conveyor unit as a result of an exclusive driving movement of the at least one conveyor element and/or of the at least one further conveyor element by means of the individual drive unit, which movement is in particular uncoupled from a driving movement of the continuous conveyor unit by means of the conveyor drive unit. It is moreover conceivable that products are conveyed as a result of superposing a driving movement of the at least one conveyor element and/or of the at least one further conveyor element by means of the individual drive unit and a driving movement of the continuous conveyor unit by means of the conveyor drive unit. Different operating states can preferably be achieved by means of the individual drive unit, for example an operating state in which the at least one conveyor element and the at least one further conveyor element can be driven in opposite directions for example, an operating state in which only one of the two conveyor elements can be driven, an operating state in which both are undriven, in particular fixed relative to the continuous conveyor unit, in particular fixed in rotation, and are only movable together by a rotating movement of the continuous conveyor unit, and so on. Further possibilities, deemed appropriate by a person skilled in the art, for transport by means of the transport device, in particular the continuous conveyor unit, are likewise conceivable.

A "product" is to be understood in particular as an item to be packaged, in particular an unpacked item, or a package which contains at least one item or is empty, for example a carton, a container, a tray, a biscuit, a chocolate bar, a film package, for example a tubular bag or the like. The products can have any shape deemed appropriate by a person skilled in the art, for example a product shape that is round, oval, polygonal or the like.

The guide unit preferably has at least one frame and/or stand unit, at least one guide roller mounted rotatably on the frame and/or stand unit, and/or a guide rail arranged on the frame and/or stand unit. The continuous conveyor unit is preferably mounted movably on the frame and/or stand unit of the guide unit, in particular at least by means of the guide roller of the guide unit and by means of at least one drive roller of the conveyor drive unit. Further configurations of the guide unit that would be deemed appropriate by a person skilled in the art are likewise conceivable. The conveyor drive unit preferably has at least one electric motor unit which is provided at least to drive the at least one drive roller of the conveyor drive unit in rotation. The conveyor drive unit can alternatively or additionally have another motor unit, deemed appropriate by a person skilled in the art, for driving the continuous conveyor unit, for example a magnetic drive unit, an eddy current drive unit, a compressed air drive unit or the like. It is also conceivable that the conveyor drive unit additionally has a gear unit for transmitting a drive force of the motor unit, in particular of the electric motor unit.

The at least one conveyor element and/or the at least on further conveyor element are preferably designed as conveyor roller(s) having a rotation axis which runs transversely, in particular at least substantially perpendicularly, to the main transport direction of the continuous conveyor unit, in particular in a state with the continuous conveyor unit arranged on the guide unit. The rotation axis/rotation axes of the at least one conveyor element and/or of the at least one further conveyor element preferably extend(s) at least substantially parallel to or in a conveying plane of the continuous conveyor unit. It is alternatively or additionally conceivable that the at least one conveyor element and/or the at least one further conveyor element are/is designed as drive roller(s) of a respective conveyor belt segment of the continuous conveyor unit. In the alternative embodiment, the individual drive unit is preferably provided, on account of an individual drive of the at least one conveyor element and/or of the at least one further conveyor element, to drive the one or more conveyor belt segments individually, in particular in addition to a rotating drive of the continuous conveyor unit, which is formed by the one or more conveyor belt segments. Further configurations of the at least one conveyor element and/or of the at least one further conveyor element, deemed appropriate by a person skilled in the art, are likewise conceivable.

By means of the embodiment of the transport device according to the invention, an advantageous gap formation can be generated between individual rows of products from a gap-free product layer composed of unordered or regularly offset products. The gaps advantageously extend across the entire width of the product layer, particularly viewed transversely with respect to the main transport direction. It is advantageously possible to adjust the size of gaps between individual generated rows of products. A minimum size of a gap, in particular a minimum size of a gap or more than 15 mm, between individual generated rows of products preferably corresponds to a length, a width, a diameter or the like of individual products, i.e. a row of products. As a result of a juxtaposition of a multiplicity of individual drive units according to the invention or of continuous conveyor units, rows of products can advantageously be generated in several steps from an irregular product layer; for example, rows with regular spacings (gaps) can be formed in a first station, groups of rows with greater spacing (gaps) between groups can be formed in a second station, and so on. It is advantageously possible to achieve a high conveying output, in particular a high row output, for example 400 to 600 rows per minute in the case of products with, for example, a maximum length of 30 mm, preferably of 45 mm, particularly preferably of 80 mm, and very particularly preferably of less than 210 mm, viewed in the main transport direction.

Furthermore, it is proposed that the at least one conveyor element is assigned to a conveyor group of the continuous conveyor unit, and that the at least one further conveyor element is assigned to a further conveyor group of the continuous conveyor unit, wherein the individual drive unit is provided at least to drive the conveyor group and/or the further conveyor group individually.

The individual drive unit is preferably provided to drive at least the conveyor group and at least the further conveyor group independently of each other, in particular in addition to driving of the continuous conveyor unit, designed as a conveyor roller transport belt, relative to the guide unit. The at least one conveyor element is preferably assigned to a conveyor group, and the at least one further conveyor element is assigned to a further conveyor group, wherein the conveyor group and the further conveyor group can be driven in opposite directions by means of the individual drive unit, only one of the two conveyor groups can be driven, both conveyor groups are undriven and are jointly movable only together with a rotating movement of the continuous conveyor unit, the conveyor groups can be driven at different rotational speeds, and so on. The continuous conveyor unit preferably comprises a multiplicity of conveyor groups which can be driven individually by means of the individual drive unit. For individually driving individual conveyor groups, the individual drive unit can have a number of individual motor units corresponding to the number of conveyor groups, for example electric motor units, eddy current drive units, electromagnetic drive units or the like, or the individual drive unit has at least one connection unit by means of which the individual conveyor groups can be driven individually, for example a toothed belt which can be brought at least temporarily into engagement with individual conveyor groups and which, for example, has teeth uniformly distributed along a total extent of the toothed belt or teeth that are arranged non-uniformly, and so on. It is also conceivable that several conveyor groups, for example at least two conveyor groups, can jointly be driven, by means of the individual drive unit, individually relative to a further conveyor group or relative to several conveyor groups of the continuous conveyor unit. Further drive possibilities or interconnections of conveyor groups that are deemed appropriate by a person skilled in the art are likewise conceivable. By means of the embodiment according to the invention, it is possible to generate an advantageous gap formation between individual rows of products from a gap-free product layer composed of unordered or regularly offset products. It is advantageously possible to achieve an individual adaptation of driven conveyor groups to a row formation. It is advantageously possible to achieve an advantageous row formation along a short total length of a transport section of the continuous conveyor unit.

It is further proposed that the individual drive unit has at least one form-fit and/or force-fit drive element which, in order to drive the at least one conveyor element and/or the at least one further conveyor element, in particular the at least one conveyor group and/or the at least one further conveyor group, interacts with the at least one conveyor element and/or with the at least one further conveyor element. The at least one form-fit and/or force-fit drive element is preferably designed as a belt. However, it is also conceivable that the form-fit and/or force-fit drive element has another configuration deemed appropriate by a person skilled in the art, for example a configuration as a toothed wheel or the like. The at least one form-fit and/or force-fit drive element is preferably provided in order to bear at least temporarily on the at least one conveyor element and/or on the at least one further conveyor element, in particular in order to individually drive the at least one conveyor element and/or the at least one further conveyor element, in particular in addition to driving of the continuous conveyor unit relative to the guide unit. Particularly preferably, the at least one form-fit and/or force-fit drive element is designed as a toothed belt. The toothed belt preferably has teeth distributed uniformly along a total extent of the toothed belt. The toothed belt is preferably provided to engage in a drive element of the individual drive unit arranged on the at least one conveyor element and/or on the at least one further conveyor element. However, it is also conceivable that the toothed belt has teeth that are distributed non-uniformly. By means of the embodiment according to the invention, it is possible to realize a structurally simple embodiment of the transport device which in particular has low electronic control requirements. By means of a structurally simple embodiment, it is possible to generate an advantageous gap formation between individual rows of products from a gap-free product layer composed of unordered or regularly offset products.

Furthermore, it is proposed that the individual drive unit has at least one drive element which is arranged on the at least one conveyor element or on the at least one further conveyor element. The drive element is preferably arranged on an end of the at least one conveyor element or of the at least one further conveyor element facing away from the at least one form-fit and/or force-fit drive element. On each conveyor element of the individual conveyor groups, at least one drive element of the individual drive unit is preferably arranged which is provided to interact with the at least one form-fit and/or force-fit drive element in order to individually drive the individual conveyor groups. The at least one drive element is particularly preferably designed as a toothed element, in particular as a toothed wheel, which is provided to interact with the at least one form-fit and/or force-fit drive element of the individual drive unit. By means of the embodiment according to the invention, it is advantageously possible to realize a reliable individual drive unit. By means of a structurally simple embodiment, it is possible to generate an advantageous gap formation between individual rows of products from a gap-free product layer composed of unordered or regularly offset products.

It is additionally proposed that the individual drive unit has at least one coupling unit which is provided to move at least one drive element of the individual drive unit and/or a form-fit and/or force-fit drive element for coupling them to each other or for uncoupling them from each other. The coupling unit is preferably provided to switch on or switch off an engagement of the at least one drive element in the form-fit and/or force-fit drive element. The coupling unit is preferably provided to move the at least one drive element and/or the at least one form-fit and/or force-fit drive element relative to the guide unit, in particular along a direction transverse, in particular at least substantially perpendicular, to the main transport direction of the continuous conveyor unit. Alternatively, it is also conceivable that the coupling unit is provided to couple or uncouple a drive element of the individual drive unit and/or a form-fit and/or force-fit drive element by means of the action of a magnetic force. The coupling unit is preferably provided to lift the at least one drive element and/or the at least one form-fit and/or force-fit drive element away from each other, in particular in order to switch off or suppress an individual drive of the at least one conveyor element and/or of the at least one further conveyor element. However, it is also conceivable that the coupling unit is alternatively or additionally provided to move a multiplicity of drive elements and/or form-fit and/or force-fit drive elements of the individual drive unit independently of each other, in particular in order to achieve individual switching-on or switching-off of individual conveyor groups of conveyor elements. By means of the embodiment according to the invention, it is advantageously possible to achieve a structurally simple switching-on or switching-off of a movement of the at least one conveyor element and/or of the at least one further conveyor element, in particular of the conveyor group and/or of the further conveyor group, superposing the movement of the continuous conveyor unit. By means of a structurally simple embodiment, it is possible to generate an advantageous gap formation between individual rows of products from a gap-free product layer composed of unordered or regularly offset products.

Furthermore, it is proposed that the individual drive unit is arranged at least partially on two mutually remote sides of the at least one conveyor element and/or of the at least one further conveyor element. The individual drive unit preferably comprises at least the form-fit and/or force-fit drive element which is arranged on one side of the at least one conveyor element and/or of the at least one further conveyor element, and at least one further form-fit and/or force-fit drive element which is arranged on a further side of the at least one conveyor element and/or of the at least one further conveyor element. The at least one form-fit and/or force-fit drive element is preferably assigned at least to the at least one conveyor group. The at least one further form-fit and/or force-fit drive element is preferably assigned at least to the at least one further conveyor element. Preferably, the at least one form-fit and/or force-fit drive element and the at least one further form-fit and/or force-fit drive element can be driven independently of each other. Preferably, the at least one form-fit and/or force-fit drive element is provided to drive, in particular temporarily, the at least one conveyor element, in particular the at least one conveyor group to which the at least one conveyor element is assigned. The at least one further form-fit and/or force-fit drive element is preferably provided to drive, in particular temporarily, the at least one further conveyor element, in particular the at least one further conveyor group to which the at least one further conveyor element is assigned. By means of the embodiment according to the invention, it is advantageously possible to achieve a structurally simple subdivision of individually driven conveyor elements, in particular conveyor groups. By means of a structurally simple embodiment, it is possible to generate an advantageous gap formation between individual rows of products from a gap-free product layer composed of unordered or regularly offset products.

It is moreover proposed that the individual drive unit, in particular in an alternative embodiment of the individual drive unit, has at least one magnetic drive element which interacts with the at least one conveyor element and/or with the at least one further conveyor element in order to drive the at least one conveyor element and/or the at least one further conveyor element. The magnetic drive element can be configured as a permanent magnet or as an electromagnet. Particularly in an alternative embodiment of the individual drive unit, at least one countermagnetic drive element of the individual drive unit, corresponding to the magnetic drive element of the individual drive unit, is preferably arranged on the at least one conveyor element and/or on the at least one further conveyor element. Particularly in an alternative embodiment of the individual drive unit, at least one countermagnetic drive element of the individual drive unit, corresponding to the magnetic drive element of the individual drive unit, is preferably arranged on each conveyor element of the continuous conveyor unit. However, it is also conceivable that, particularly in an alternative embodiment of the individual drive unit, at least one countermagnetic drive element, in particular just one countermagnetic drive element, of the individual drive unit, corresponding to the magnetic drive element of the individual drive unit, is provided per conveyor group. The countermagnetic drive element of the individual drive unit can be configured as a permanent magnet or as an electromagnet. The controlling and/or regulating unit of the transport device is preferably provided in order to activate or deactivate the magnetic drive element and/or the countermagnetic drive element of the individual drive unit or to trigger an actuator which is provided in order to move the magnetic drive element and/or the countermagnetic drive element of the individual drive unit to an active position or a non-active position. By means of the embodiment according to the invention, it is advantageously possible to achieve a compact configuration of the individual drive unit, in order to generate an advantageous gap formation between individual rows of products from a gap-free product layer composed of unordered or regularly offset products.

It is additionally proposed that the transport device comprises at least one vacuum unit for generating an underpressure in order to draw the at least one product in the direction of the at least one conveyor element and/or of the at least one further conveyor element. The vacuum unit preferably comprises at least one underpressure generator, for example a vacuum fan or the like. The underpressure generator preferably has a configuration already known to a person skilled in the art. The vacuum unit is preferably arranged under the continuous conveyor unit, in particular in such a way that the continuous conveyor unit is movable across vacuum openings of the vacuum unit, or the vacuum unit is at least partially integrated in the continuous conveyor unit, in particular in the at least one conveyor element and/or the at least one further conveyor element. By means of the embodiment according to the invention, it is advantageously possible to apply a vacuum to the continuous conveyor unit. It is advantageously possible to achieve a reliable formation of rows of products, particularly since it is possible to achieve an advantageous effect of driving forces of the at least one conveyor element and/or of the at least one further conveyor element on the products. It is possible to generate an advantageous gap formation between individual rows of products from a gap-free product layer composed of unordered or regularly offset products.

Furthermore, it is proposed that the at least one conveyor element and/or the at least one further conveyor element have/has a maximum circumferential surface extent along a direction extending transversely with respect to the main transport direction of the continuous conveyor unit, which maximum circumferential surface extent corresponds at least substantially to a maximum transverse extent of the continuous conveyor unit. A maximum circumferential surface extent of the at least one conveyor element and/or of the at least one further conveyor element preferably extends along a direction extending at least substantially parallel to the rotation axis of the at least one conveyor element and/or of the at least one further conveyor element. Here, "substantially parallel" is to be understood in particular as an orientation of a direction relative to a reference direction, in particular in one plane, wherein the direction deviates from the reference direction particularly by less than 8°, advantageously by less than 5° and particularly advantageously by less than 2°. However, it is also conceivable, particularly in an alternative embodiment of the continuous conveyor unit, that the at least one conveyor element and/or the at least one further conveyor element has a maximum circumferential surface extent which is less than a maximum transverse extent of the continuous conveyor unit, in particular in such a way that at least two conveyor elements can be arranged alongside each other in a row, in particular along a direction extending transversely, in particular at least substantially perpendicularly, to the main transport direction and/or at least substantially parallel to the rotation axis of the at least one conveyor element. By means of the embodiment according to the invention, it is advantageously possible for a large effective surface area of the at least one conveyor element and/or of the at least one further conveyor element to be made available for formation or rows. It is possible to generate an advantageous gap formation between individual rows of products from a gap-free product layer composed of unordered or regularly offset products. In particular, in an arrangement of several conveyor elements along a direction extending transversely, in particular at least substantially perpendicularly, to the main transport direction and/or at least substantially parallel to the rotation axis of the at least one conveyor element, it is advantageously possible to achieve different row formation functions on each side of the continuous conveyor unit.

The invention moreover starts out from a method for transporting at least one product, in particular for forming rows and/or groups of products, in particular by means of a transport device according to the invention. It is proposed that, in at least one method step, at least one conveyor element, in particular at least one conveyor group, is driven by means of an individual drive unit with a rotational speed and/or a rotational direction which differs from a rotational speed and/or a rotational direction of at least one further conveyor element, in particular of at least one further conveyor group. By means of the embodiment according to the invention, it is possible to generate an advantageous gap formation between individual rows of products from a gap-free product layer composed of unordered or regularly offset products. The gaps advantageously extend across the entire width of the product layer, particularly viewed transversely with respect to the main transport direction. It is advantageously possible to adjust the size of gaps between individual generated rows of products. A minimum size of a gap between individual generated rows of products preferably corresponds to a length, a width, a diameter or the like of individual products, i.e. a row of products. As a result of a juxtaposition of a multiplicity of individual drive units according to the invention or of continuous conveyor units, rows of products can advantageously be generated in several steps from an irregular product layer; for example, rows with regular spacings (gaps) can be formed in a first station, groups of rows with greater spacing (gaps) between groups can be formed in a second station, and so on.

It is moreover proposed that, in at least one method step, the at least one conveyor element, in particular at least one conveyor group, and the at least one further conveyor element, in particular at least one further conveyor group, are driven in opposite rotational directions and/or at different rotational speeds by means of the individual drive unit, in particular in addition to driving of the continuous conveyor unit along the main transport direction of the continuous conveyor unit. The at least one conveyor element, in particular the at least one conveyor group, is preferably driven in rotation in the direction of the main transport direction of the continuous conveyor unit. The at least one further conveyor element, in particular the at least one further conveyor group, is preferably driven in rotation counter to the main transport direction of the continuous conveyor unit. However, it is also conceivable that the at least one further conveyor element, in particular the at least one further conveyor group, is driven in rotation in the direction of the main transport direction of the continuous conveyor unit and that the at least one conveyor element, in particular the at least one conveyor group, is driven in rotation counter to the main transport direction of the continuous conveyor unit, or that only one of the conveyor elements, in particular at least one of the conveyor groups, is driven in rotation while the other conveyor element, in particular the other conveyor group, is undriven, in particular during a rotational drive of the continuous conveyor unit relative to the guide unit. By means of the embodiment according to the invention, it is advantageously possible to achieve a movement of products toward each other. It is possible to generate an advantageous gap formation between individual rows of products from a gap-free product layer composed of unordered or regularly offset products.

It is furthermore proposed that, in at least one method step, a rotational movement of the at least one conveyor element, in particular of the at least one conveyor group, and of the at least one further conveyor element, in particular of the at least one further conveyor group, generated by means of the individual drive unit, superposes a driving movement, generated by means of a conveyor drive unit, of the continuous conveyor unit relative to the guide unit. A rotational movement of the at least one conveyor element, in particular of the at least one conveyor group, and of the at least one further conveyor element, in particular of the at least one further conveyor group, generated by means of the individual drive unit, preferably superposes a rotating movement of the continuous conveyor unit relative to the guide unit. By means of the embodiment according to the invention, it is advantageously possible, in particular during transport of products along the main transport direction of the continuous conveyor unit, to generate an advantageous gap formation between individual rows of products from a gap-free product layer composed of unordered or regularly offset products.

The transport device according to the invention and/or the method according to the invention are not intended to be limited to the above-described use and embodiment. In particular, the transport device according to the invention and/or the method according to the invention can, in order to perform a function described herein, have a number of individual elements, components, units and method steps which differs from the number mentioned herein. Moreover, with regard to the value ranges specified in this disclosure, it is also intended that values lying within the stated limits are disclosed and usable as desired. Moreover, all features disclosed with respect to the transport device according to the invention are also considered to be disclosed with respect to the method according to the invention.

BRIEF DESCRIPTION OF THE DRAWINGS

Further advantages will become clear from the following description of the drawing. The drawing shows illustrative embodiments of the invention. The drawing, the description and the claims contain numerous features in combination. A person skilled in the art will also expediently consider the features individually and bring them together to obtain further useful combinations.

In the drawing.

DETAILED DESCRIPTION

Figure 1:
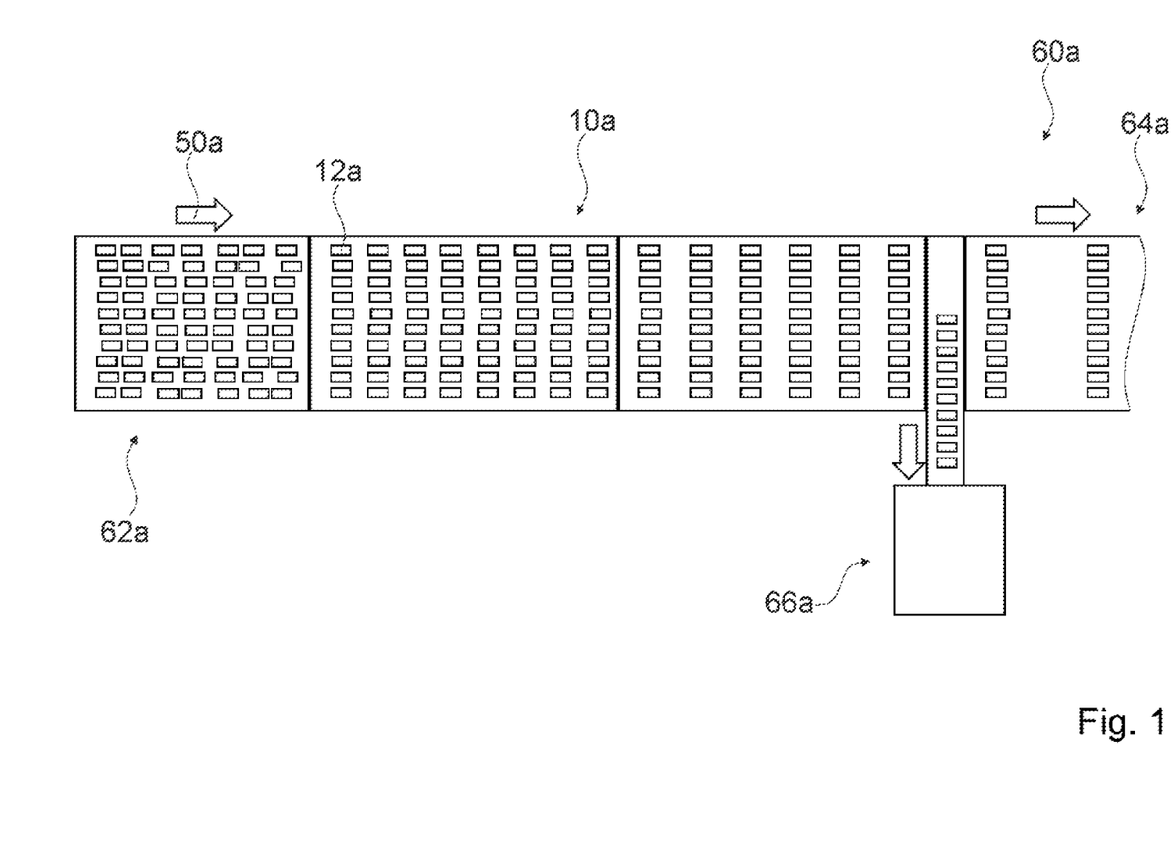
FIG. 1 shows a schematic view of a transport section of a packaging machine with at least one transport device according to the invention.

FIG. 1 shows part of a transport section of a packaging machine 60a for carrying out a process for packaging of products 12a. The packaging machine 60a comprises at least one transport device 10a for transporting at least one product 12a, at least one product group and/or at least one product stack, in particular for delivery to a packaging process of the packaging machine 60a. However, it is also conceivable that the transport device 10a is part of another machine which is deemed appropriate by a person skilled in the art and which has at least one transport section, for example part of a conveyor machine or the like. The transport device 10a is preferably provided to transfer at least one product 12a, at least one product group and/or at least one product stack from a feed device 62a of the packaging machine 60a to a discharge device 64a of the packaging machine 60a. The packaging machine 60a can have a multiplicity of transport devices 10a which are arranged in series and which in particular are arranged between the feed device 62a and the discharge device 64a. The packaging machine 60a preferably comprises at least one removal unit 66a which is provided to remove products 12a, in particular at least one row of products 12a formed by means of the transport device 10a, or which is provided for directly feeding products 12a to a packaging process. The removal unit 66a is preferably provided to remove products 12a, in particular at least one row of products 12a formed by means of the transport device 10a, along a direction of the transport device 10a extending transversely, in particular at least substantially perpendicularly, with respect to a main transport direction 50a of the transport device 10a, in particular before the removal device 64a when viewed along a product stream. The removal unit 66a is designed in particular as a cross conveyor. However, it is also conceivable that the removal unit 66a has another configuration which is deemed appropriate by a person skilled in the art, for example as a gripper unit, as a suction cup unit, etc.

Figure 2:
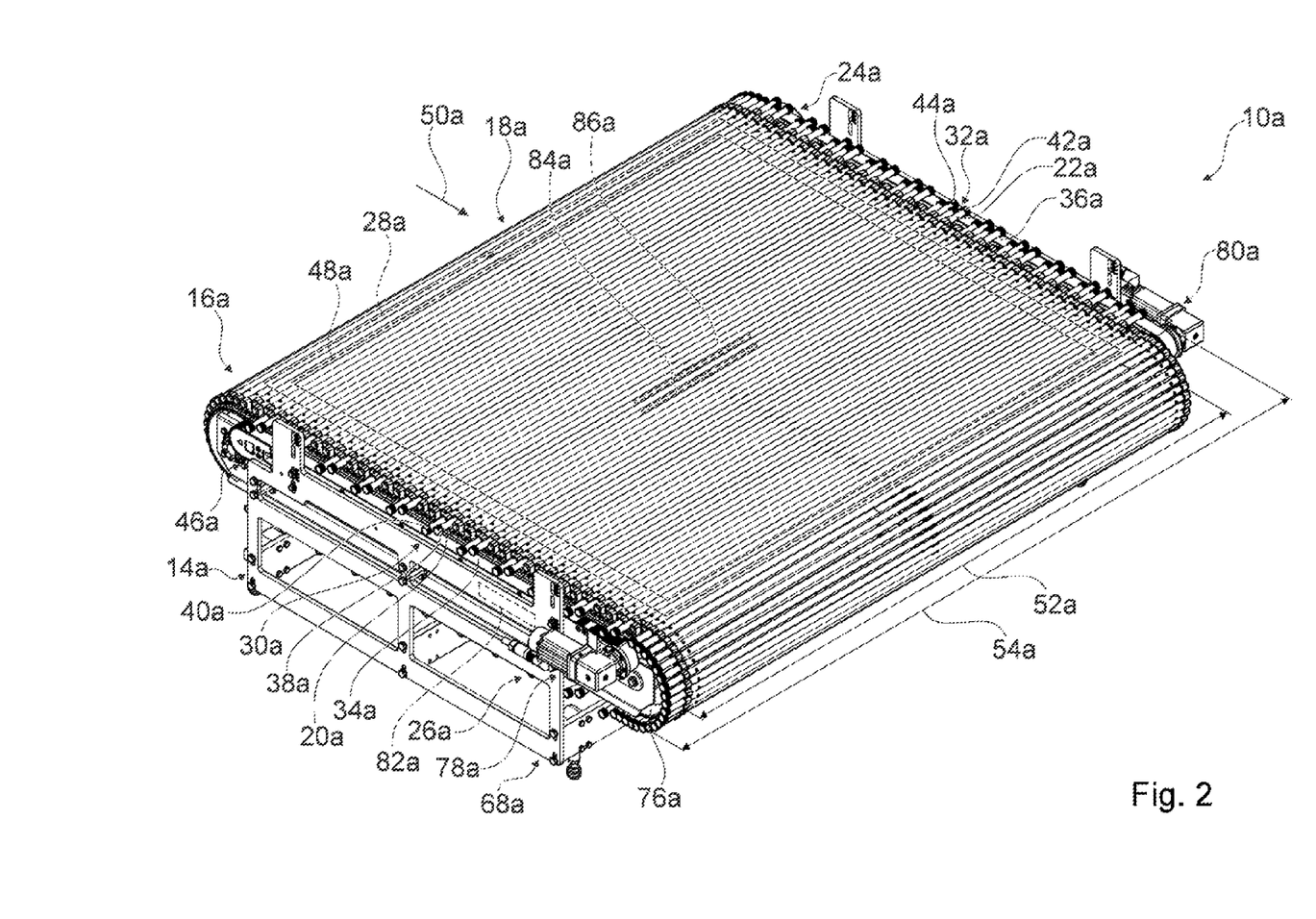
FIG. 2 shows a schematic detailed view of the transport device according to the invention.

FIG. 2 shows a detailed view of an individual transport device 10a. The transport device 10a for transporting at least one product 12a, in particular for forming rows and/or groups of products 12a, comprises at least one guide unit 14a, at least one conveyor unit 16a, which has at least one continuous conveyor unit 18a mounted movably relative to the guide unit 14a, in particular an endless conveyor roller transport belt. The continuous conveyor unit 18a comprises at least one movably mounted conveyor element 20a, in particular a conveyor roller, and at least one further movably mounted conveyor element 22a, in particular a further conveyor roller, which are connected to each other to form the continuous conveyor unit 18a and are at least jointly movable relative to the guide unit 14a. The at least one conveyor element 20a and/or the at least one further conveyor element 22a have/has a maximum circumferential surface extent 52a along a direction extending transversely with respect to the main transport direction 50a of the continuous conveyor unit 18a, which maximum circumferential surface extent 52a corresponds at least substantially to a maximum transverse extent 54a of the continuous conveyor unit 18a. The continuous conveyor unit 18a preferably comprises a multiplicity of movably mounted conveyor elements 20a, 22a which are connected to each other to form the continuous conveyor unit 18a and are at least jointly movable relative to the guide unit 14a, in particular along the main transport direction 50a of the continuous conveyor unit 18a. The transport device 10a moreover comprises at least one conveyor drive unit 24a for driving the continuous conveyor unit 18a relative to the guide unit 14a, in particular for driving the continuous conveyor unit 18a in rotation about the guide unit 14a, in particular about a guide roller 76a of the guide unit 14a. The guide unit 14a preferably comprises at least one frame and/or stand unit 68a on which at least the guide roller 76a of the guide unit 14a and the conveyor drive unit 24a are at least partially arranged and/or mounted (cf. FIG. 4). The conveyor drive unit 24a preferably comprises at least one electric motor unit 70a for driving the continuous conveyor unit 18a relative to the guide unit 14a, in particular relative to the frame and/or stand unit 68a. The conveyor drive unit 24a has at least one drive roller 72a, on which the continuous conveyor unit 18a preferably bears for driving. The conveyor drive unit 20a has in particular a drive belt 74a for transmitting a driving force from the electric motor unit 70a to the drive roller 72a (cf. FIG. 4). However, it is also conceivable that the conveyor drive unit 24a has another unit deemed appropriate by a person skilled in the art, for example a toothed wheel unit or the like, for transmitting a driving force from the electric motor unit 70a to the drive roller 72a.

The transport device 10a moreover comprises at least one individual drive unit 26a which is provided at least to individually drive at least the at least one conveyor element 20a and/or the at least one further conveyor element 22a, in particular in addition to driving of the continuous conveyor unit 18a relative to the guide unit 14a by means of the conveyor drive unit 24a. The transport device 10a preferably comprises a controlling and/or regulating unit 82a for controlling and/or regulating the individual drive unit 26a. The individual drive unit 26a is preferably provided at least to drive the at least one conveyor element 20a and/or the at least one further conveyor element 22a independently of the conveyor drive unit 24a. The individual drive unit 26a is preferably provided at least to drive the at least one conveyor element 20a and the at least one further conveyor element 22a independently of each other, in particular in addition to driving of the continuous conveyor unit 18a relative to the guide unit 14a by means of the conveyor drive unit 24a. The individual drive unit 26a is preferably provided to drive the at least one conveyor element 20a and/or the at least one further conveyor element 22a actively or passively. The individual drive unit 26a is preferably provided to superpose a driving movement of the at least one conveyor element 20a and/or of the at least one further conveyor element 22a on a driving movement of the continuous conveyor unit 18a relative to the guide unit 14a. The individual drive unit 26a preferably has at least one electric motor unit 78a which is provided at least to drive the at least one conveyor element 20a and/or the at least one further conveyor element 22a in rotation. The individual drive unit 26a preferably has at least one further electric motor unit 80a which is provided at least to drive the at least one conveyor element 20a and/or the at least one further conveyor element 22a in rotation. In particular, the electric motor unit 78a is assigned to the at least one conveyor element 20a, in particular to at least one conveyor group 30a of the continuous conveyor unit 18a comprising the at least one conveyor element 20a. In particular, the further electric motor unit 80a is assigned to the at least one further conveyor element 22a, in particular to at least one further conveyor group 32a of the continuous conveyor unit 18a comprising the at least one further conveyor element 22a. However, it is also conceivable that the individual drive unit 26a alternatively or additionally has another motor unit deemed appropriate by a person skilled in the art for driving the at least one conveyor element 20a and/or the at least one further conveyor element 22a, for example a magnetic drive unit, an eddy current drive unit, a compressed air drive unit or the like.

The at least one conveyor element 20a is assigned to a conveyor group 30a of the continuous conveyor unit 18a, and the at least one further conveyor element 22a is assigned to a further conveyor group 32a of the continuous conveyor unit 18a, wherein the individual drive unit 26a is provided at least to individually drive the conveyor group 30a and/or the further conveyor group 32a. The conveyor group 30a preferably comprises a multiplicity of conveyor elements 20a, which can preferably be individually driven jointly by means of the individual drive unit 26a. The further conveyor group 32a preferably comprises a multiplicity of further conveyor elements 22a, which can preferably be individually driven jointly by means of the individual drive unit 26a. The individual drive unit 26a is preferably provided to drive at least the conveyor group 30a and at least the further conveyor group 32a independently of each other, in particular in addition to driving of the continuous conveyor unit 18a, designed as a conveyor roller transport belt, relative to the guide unit 14a by means of the conveyor drive unit 24a. The continuous conveyor unit 18a preferably comprises a multiplicity of conveyor groups 30a and/or further conveyor groups 32a which can be driven individually by means of the individual drive unit 26a. The conveyor groups 30a and/or the further conveyor groups 32a can be uniformly distributed, for example alternately distributed, on the continuous conveyor unit 18a, along a total extent of the continuous conveyor unit 18a, or the conveyor groups 30a and/or the further conveyor groups 32a can be arranged non-uniformly on the continuous conveyor unit 18a, along the total extent of the continuous conveyor unit 18a, for example two conveyor groups 30a followed by a further conveyor group 32a, one conveyor group 30a followed by two further conveyor groups 32a, an odd or even number of conveyor groups 30a followed by an odd or even number of further conveyor groups 32a or the like. Depending on the field of use, a person skilled in the art will choose a division of conveyor groups 30a and/or further conveyor groups 32a that he deems appropriate for the field of use. Different operating states of an individual drive of the at least one conveyor element 20a, in particular of the at least one conveyor group 30a, and of the at least one further conveyor element 22a, in particular of the at least one further conveyor group 32a, can preferably be achieved by means of the individual drive unit 26a, for example an operating state in which the at least one conveyor element 20a, in particular the at least one conveyor group 30a, and the at least one further conveyor element 22a, in particular the at least one further conveyor group 32a, can be driven in opposite directions (cf. FIG. 3 for example), an operating state in which only one of the two conveyor elements 20a, 22a, in particular one of the two conveyor groups 30a, 32a, can be driven, an operating state in which both conveyor elements 20a, 22a, in particular both conveyor groups 30a, 32a, are not driven and are only movable together by a rotating movement of the continuous conveyor unit 18a, and so on. Further possibilities, deemed appropriate by a person skilled in the art, for driving the conveyor elements 20a, 22a, in particular the conveyor groups 30a, 32a, are likewise conceivable.

Figure 4:
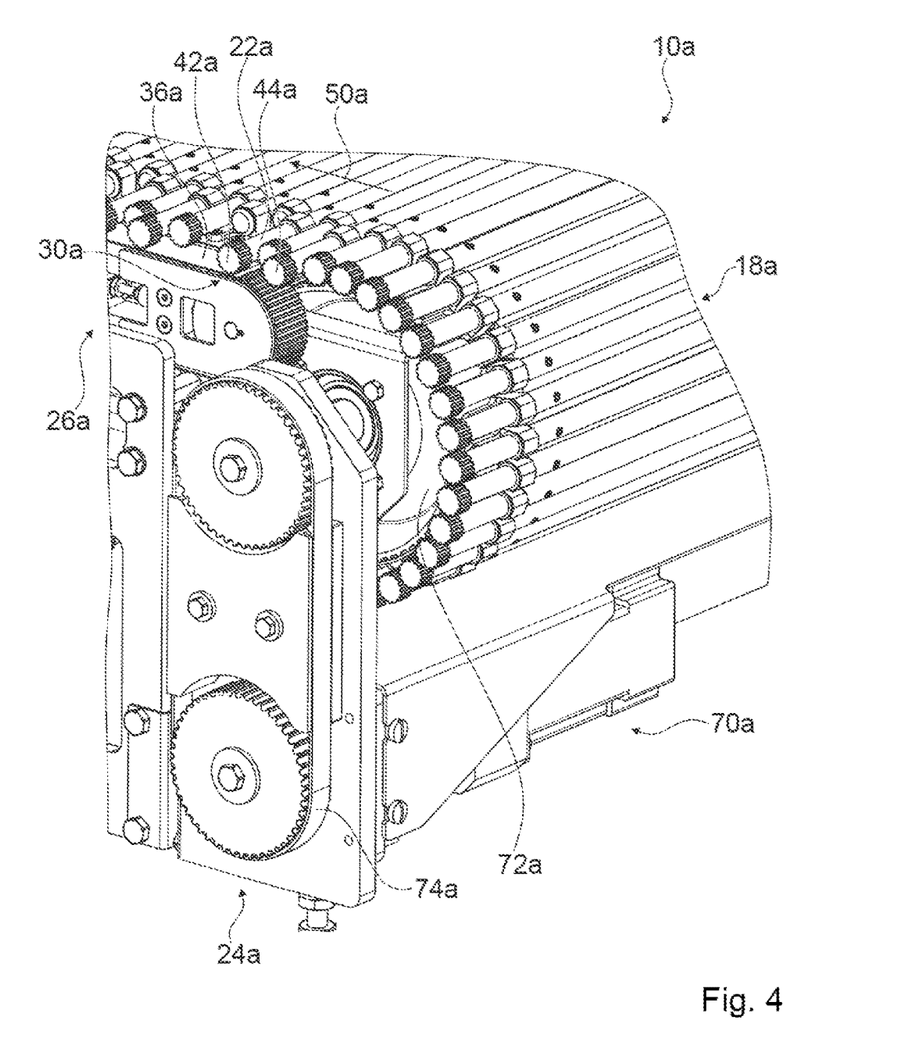
FIG. 4 shows a schematic detailed view of a conveyor drive unit of the transport device according to the invention for driving the continuous conveyor unit.
Figure 5:
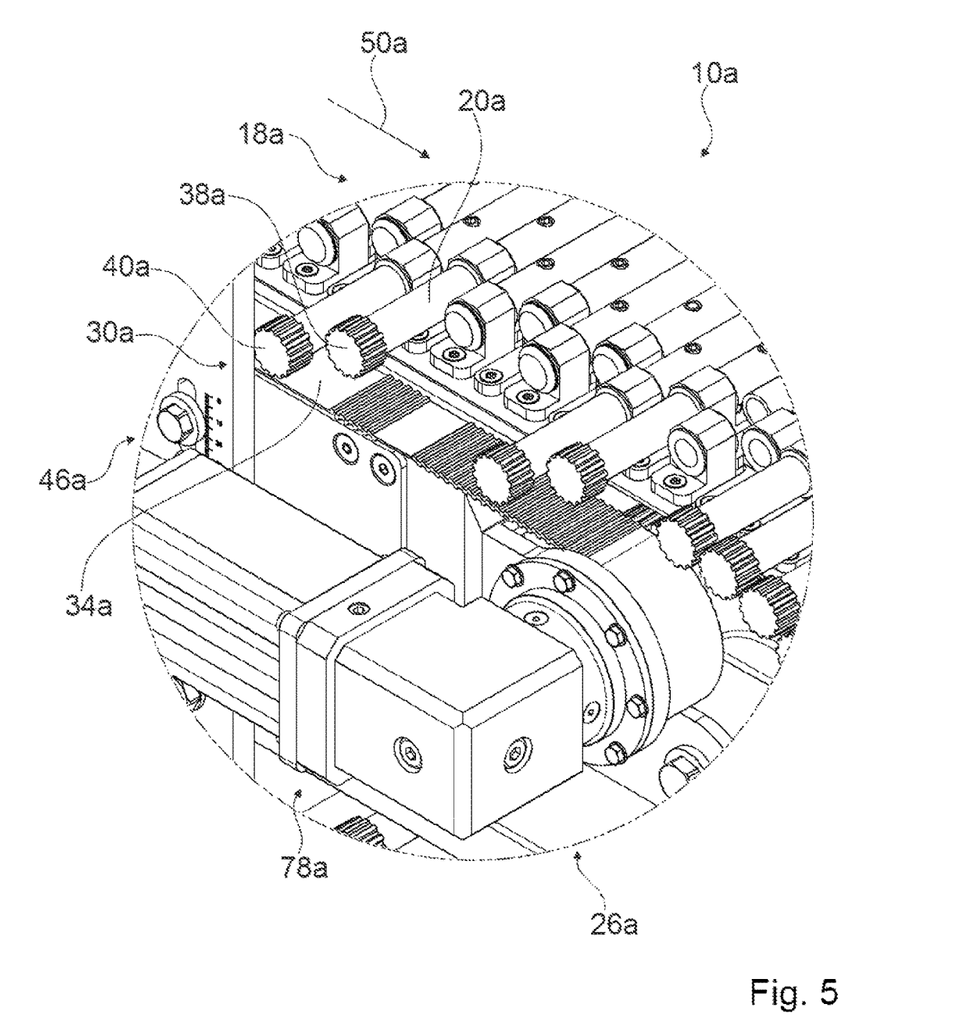
FIG. 5 shows a schematic detailed view of an individual drive unit of the transport device according to the invention for individually driving conveyor elements or conveyor groups of conveyor elements of the continuous conveyor unit.

The individual drive unit 26a has at least one form-fit and/or force-fit drive element 34a which, in order to drive the at least one conveyor element 20a, in particular the at least one conveyor group 30a, and/or the at least one further conveyor element 22a, in particular the at least one further conveyor group 32a, interacts at least with the at least one conveyor element 20a and/or with the at least one further conveyor element 22a (cf. FIGS. 2, 4 and 5). The individual drive unit 26a preferably comprises at least one further form-fit and/or force-fit drive element 36a which, in order to drive the at least one conveyor element 20a, in particular the at least one conveyor group 30a, and/or the at least one further conveyor element 22a, in particular the at least one further conveyor group 32a, interacts at least with the at least one conveyor element 20a and/or with the at least one further conveyor element 22a (cf. FIGS. 2, 4 and 5). The at least one form-fit and/or force-fit drive element 34a is preferably assigned to the at least one conveyor element 20a, in particular to the at least one conveyor group 30a. The at least one further form-fit and/or force-fit drive element 36a is preferably assigned to the at least one further conveyor element 22a, in particular to the at least one further conveyor group 32a. The at least one form-fit and/or force-fit drive element 34a and the at least one further form-fit and/or force-fit drive element 36a preferably have an at least substantially analogous configuration, such that in particular a description of one of the two form-fit and/or force-fit drive elements 34a, 36a can be transposed to the other one. However, it is also conceivable that the two form-fit and/or force-fit drive elements 34a, 36a have a configuration in which they at least partially differ from each other. The form-fit and/or force-fit drive element 34a, 36a is preferably configured as a toothed belt. The form-fit and/or force-fit drive element 34a, 36a preferably has teeth distributed uniformly or non-uniformly along a total extent of the form-fit and/or force-fit drive element 34a, 36a. The at least one form-fit and/or force-fit drive element 34a can preferably be driven, in particular driven in rotation, by means of the electric motor unit 78a of the individual drive unit 26a. The at least one further form-fit and/or force-fit drive element 36a can preferably be driven, in particular driven in rotation, by means of the further electric motor unit 80a of the individual drive unit 26a.

The individual drive unit 26a has at least one drive element 38a, 40a, 42a, 44a which is arranged on the at least one conveyor element 20a, in particular on the at least one conveyor group 30a, or on the at least one further conveyor element 22a, in particular on the at least one further conveyor group 32a (cf. FIGS. 2, 4 and 5). In particular, at least one drive element 38a is arranged on at least one end of the at least one conveyor element 20a. The at least one drive element 38a is preferably connected to the at least one conveyor element 20a for conjoint rotation therewith. Preferably, at least one drive element 42a is arranged on at least one end of the at least one further conveyor element 22a. The at least one drive element 42a is preferably connected to the at least one further conveyor element 22a for conjoint rotation therewith. The individual drive unit 26a preferably comprises a multiplicity of drive elements 38a, 40a, 42a, 44a, wherein at least one is provided per conveyor group 30a, 32a. However, it is also conceivable that one drive element 38a, 40a, 42a, 44a per conveyor element 20a, 22a is provided for each conveyor group 30a, 32a and at least temporarily interacts with the form-fit and/or force-fit drive element 34a and/or with the further form-fit and/or force-fit drive element 36a. The multiplicity of drive elements 38a, 40a, 42a, 44a preferably have an at least substantially analogous configuration, such that in particular a description of one of the drive elements 38a, 40a, 42a, 44a can be transposed to the others. However, it is also conceivable that the drive elements 38a, 40a, 42a, 44a have a configuration in which they at least partially differ from each other. The at least one drive element 38a, 40a, 42a, 44a is configured as a toothed element, in particular as a toothed wheel, which is provided to interact with the at least one form-fit and/or force-fit drive element 34a and/or with the at least one further form-fit and/or force-fit drive element 36a of the individual drive unit 26a.

The individual drive unit 26a has at least one coupling unit 46a which is provided to move at least one of the drive elements 38a, 40a, 42a, 44a of the individual drive unit 26a and/or at least one of the form-fit and/or force-fit drive elements 34a, 36a of the individual drive unit 26a for coupling them to each other or for uncoupling them. Preferably, the coupling unit 46a is provided to switch on or switch off an engagement of the at least one drive element 38a, 40a, 42a, 44a in one of the form-fit and/or force-fit drive elements 34a, 36a. The coupling unit 46a is preferably provided to move at least one of the drive elements 38a, 40a, 42a, 44a and/or at least one of the form-fit and/or force-fit drive elements 34a, 36a relative to the guide unit 14a, in particular along a direction transverse, in particular at least substantially perpendicular, to the main transport direction 50a of the continuous conveyor unit 18a. The coupling unit 46a is preferably provided to lift at least one of the drive elements 38a, 40a, 42a, 44a and at least one of the form-fit and/or force-fit drive elements 34a, 36a away from each other, in particular in order to switch off or suppress an individual drive of the at least one conveyor element 20a and/or of the at least one further conveyor element 22a.

The individual drive unit 26a is arranged at least partially on two mutually remote sides of the at least one conveyor element 20a and/or of the at least one further conveyor element 22a. Preferably, the at least one form-fit and/or force-fit drive element 34a is arranged on one side of the at least one conveyor element 20a and/or of the at least one further conveyor element 22a. In particular, the at least one further form-fit and/or force-fit drive element 36a is arranged on a further side of the at least one conveyor element 20a and/or of the at least one further conveyor element 22a.

The individual drive unit 26a alternatively or additionally comprises at least one magnetic drive element 48a (shown only by broken lines in FIG. 2) which interacts at least with the at least one conveyor element 20a and/or with the at least one further conveyor element 22 in order to drive the at least one conveyor element 20a, in particular the at least one conveyor group 30a, and/or the at least one further conveyor element 22a, in particular the at least one further conveyor group 32a. Particularly in an alternative embodiment of the individual drive unit 26a, at least one countermagnetic drive element 84a, 86a (shown only by broken lines in FIG. 2) of the individual drive unit 26a, corresponding to the magnetic drive element 48a of the individual drive unit 26a, is preferably arranged on the at least one conveyor element 20a and/or on the at least one further conveyor element 22a. The controlling and/or regulating unit 82a of the transport device 10a is preferably provided in order to activate or deactivate the magnetic drive element 48a and/or the at least one countermagnetic drive element 84a, 86a of the individual drive unit 26a or to trigger an actuator (not shown here) which is provided in order to move the magnetic drive element 48a and/or the countermagnetic drive element 84a, 86a of the individual drive unit 26a to an active position or a non-active position.

The transport device 10a comprises at least one vacuum unit 28a for generating an underpressure in order to draw the at least one product 12a in the direction of the at least one conveyor element 20a and/or of the at least one further conveyor element 22a (cf. FIG. 2). The vacuum unit 28a preferably comprises at least one underpressure generator, for example a vacuum fan or the like. The underpressure generator preferably has a configuration already known to a person skilled in the art. The vacuum unit 28a is preferably arranged under the continuous conveyor unit 18a, in particular in such a way that the continuous conveyor unit 18a is movable across vacuum openings of the vacuum unit 28a, or the vacuum unit 28a is at least partially integrated in the continuous conveyor unit 18a, in particular in the at least one conveyor element 20a and/or the at least one further conveyor element 22a.

Figure 3:
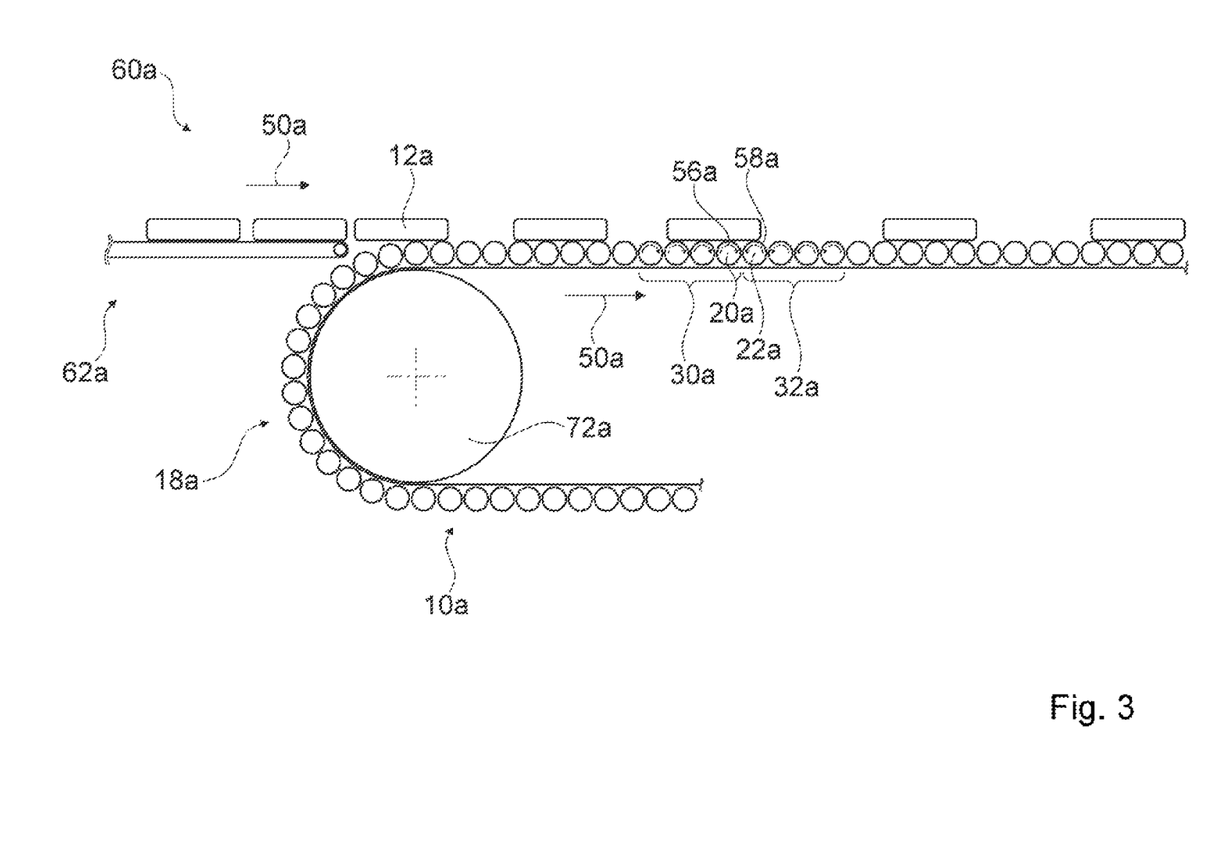
FIG. 3 shows a schematic detailed view of a continuous conveyor unit of the transport device according to the invention, with individually driven conveyor elements or conveyor groups of conveyor elements of the continuous conveyor unit.

In a method for transporting at least one product 12a, in particular for forming rows and/or groups of products 12a by means of the transport device 10a, provision is made that, in at least one method step, the at least one conveyor element 20a, in particular the at least one conveyor group 30a, is driven by means of the individual drive unit 26a with a rotational speed and/or a rotational direction 56a which differs from a rotational speed and/or a rotational direction 58a of the at least one further conveyor element 22a, in particular of the at least one further conveyor group 32 (cf. FIG. 3). In at least one method step, the at least one conveyor element 20a, in particular the at least one conveyor group 30a, and the at least one further conveyor element 22a, in particular the at least one further conveyor group 32a, are driven in opposite rotational directions 56a, 58a by means of the individual drive unit 26a. In at least one method step, a rotational movement of the at least one conveyor element 20a, in particular of the at least one conveyor group 30a, and of the at least one further conveyor element 22a, in particular of the at least one further conveyor group 32a, generated by means of the individual drive unit 26a, superposes a driving movement, generated by means of the conveyor drive unit 24a, of the continuous conveyor unit 18a relative to the guide unit 14a. As regards further method steps of the method for transporting at least one product 12a by means of the transport device 10a, reference may be made to the above description of the transport device 10a, since this description can also be read analogously on the method, and therefore all features relating to the transport device 10a are also valid in respect of the method for transporting at least one product 12a by means of the transport device 10a.

Figure 6:
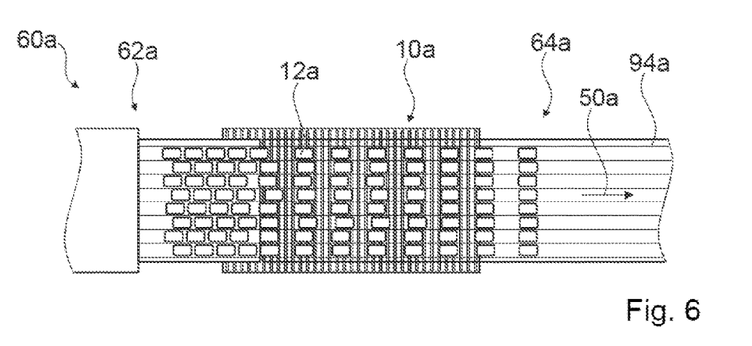
FIG. 6 shows a schematic view of a possible row-forming function from a gap-free product layer by means of the transport device according to the invention.

FIG. 6 show a possible row-forming function from a gap-free product layer of products 12a by means of the transport device 10a. Particularly in order to convey products 12a with a polygonal product shape, the transport device 10a can have at least one lateral guide element 94a. The lateral guide element 94a preferably has a longitudinal extent running at least substantially parallel to the main transport direction 50a. Particularly in order to convey products 12a with a polygonal product shape, the transport device 10a can preferably have a multiplicity of lateral guide elements 94a which extend at least substantially parallel to the main transport direction 50a. In at least one method step, the at least one conveyor element 20a, in particular the at least one conveyor group 30a, is driven by means of the individual drive unit 26a with a rotational speed and/or a rotational direction 56a which differs from a rotational speed and/or a rotational direction 58a of the at least one further conveyor element 22a, in particular of the at least one further conveyor group 32a. In particular, the at least one conveyor element 20a, in particular the at least one conveyor group 30a, and the at least one further conveyor element 22a, in particular the at least one further conveyor group 32a, are driven at least temporarily in opposite directions and/or with different rotational speeds by means of the individual drive unit 26a in order to form rows of products 12a from a gap-free product layer of products 12a, in particular after at least individual products 12a have detached themselves from the gap-free product layer as a result of an acceleration by a transport movement of the continuous conveyor unit 18*a*.

Figure 7:
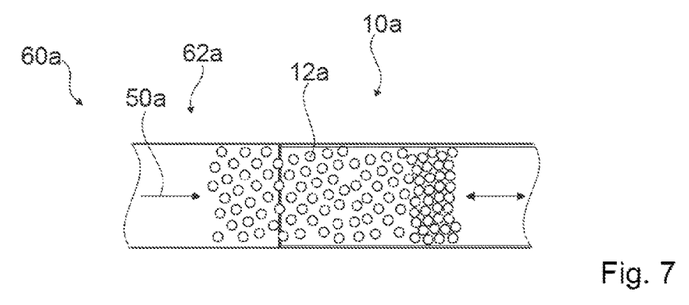
FIG. 7 shows a schematic view of a possible inline buffer function from an unordered product layer by means of the transport device according to the invention.

FIG. 7 shows a possible inline buffer function from an unordered product layer of products 12*a* by means of the transport device 10*a*. In at least one method step, the at least one conveyor element 20*a*, in particular the at least one conveyor group 30*a*, is driven by means of the individual drive unit 26*a* with a rotational speed and/or a rotational direction 56*a* which differs from a rotational speed and/or a rotational direction 58*a* of the at least one further conveyor element 22*a*, in particular of the at least one further conveyor group 32*a*. In particular, the at least one conveyor element 20*a*, in particular the at least one conveyor group 30*a*, and the at least one further conveyor element 22*a*, in particular the at least one further conveyor group 32*a*, are driven at least partially with different rotational speeds by means of the individual drive unit 26*a*.

Figure 8:
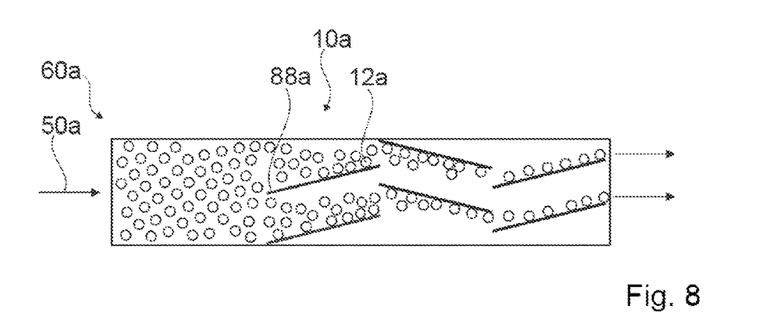
FIG. 8 shows a schematic view of a possible inline laning function from an unordered product layer by means of the transport device according to the invention.

FIG. 8 shows a possible inline laning function from an unordered product layer of products 12*a* by means of the transport device 10*a*. The transport device 10*a* comprises at least one guidance element 88*a*, in particular a multiplicity of guidance elements 88*a*, which are arranged on the continuous conveyor unit 18*a*. In at least one method step, the at least one conveyor element 20*a*, in particular the at least one conveyor group 30*a*, is driven by means of the individual drive unit 26*a* with a rotational speed and/or a rotational direction 56*a* which differs from a rotational speed and/or a rotational direction 58*a* of the at least one further conveyor element 22*a*, in particular of the at least one further conveyor group 32*a*. In particular, the conveyor elements 20*a*, 22*a*, in particular the conveyor groups 30*a*, 32*a*, are driven by means of the individual drive unit 26*a* along the main transport direction 50*a* with increasing rotational speeds.

Figure 9:
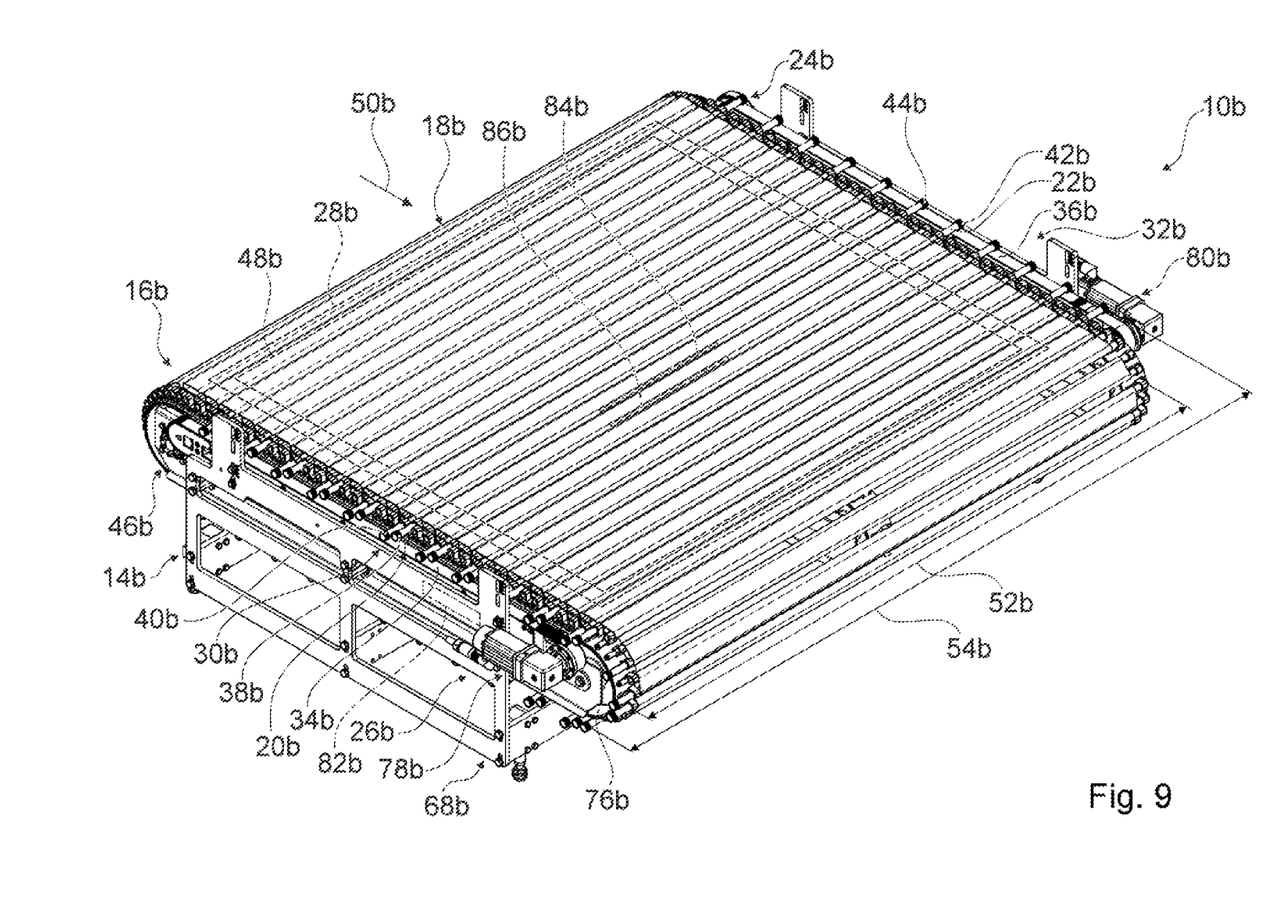
FIG. 9 shows a schematic view of an alternative embodiment of the transport device according to the invention.
Figure 10:
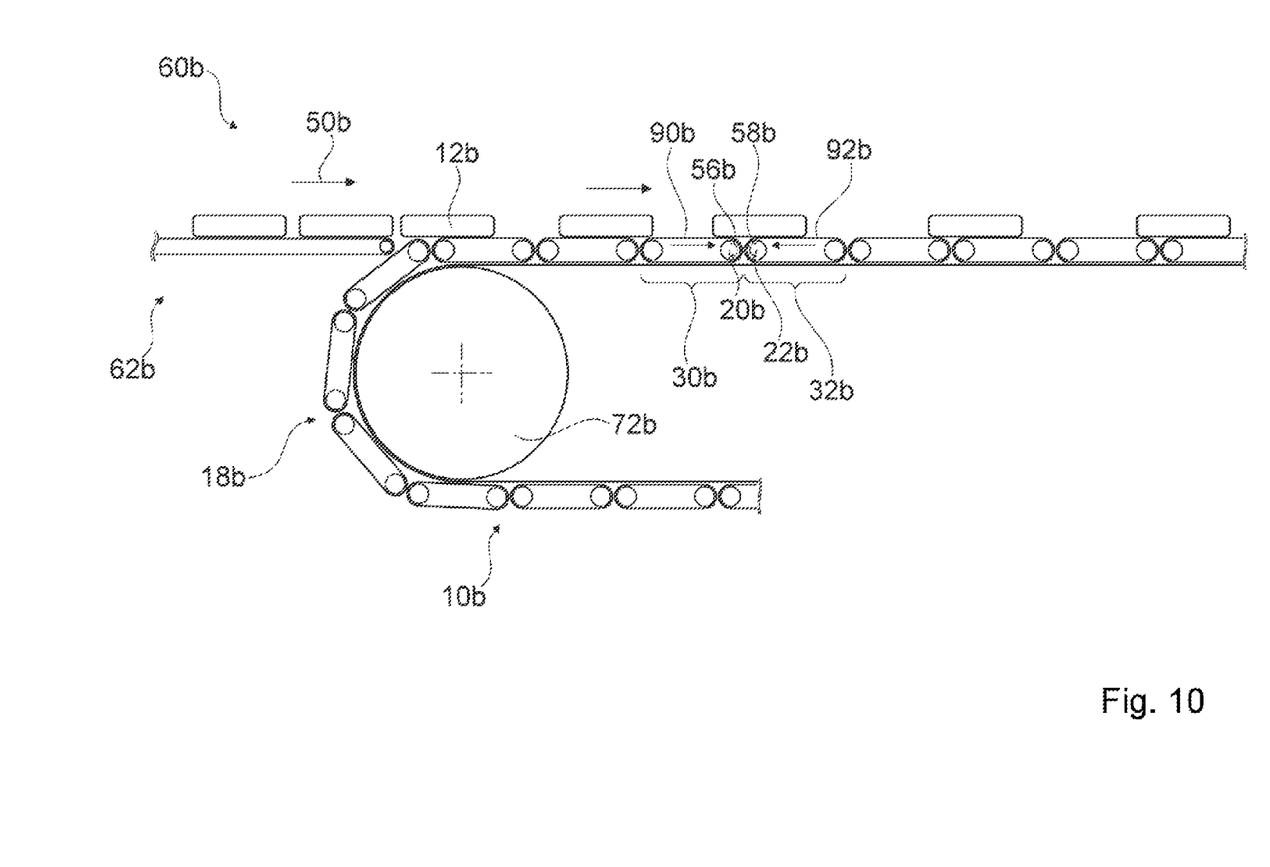
FIG. 10 shows a schematic detailed view of a continuous conveyor unit of the alternative transport device according to the invention with individually driven conveyor elements or conveyor groups of conveyor elements of the continuous conveyor unit.

FIGS. 9 and 10 show a further illustrative embodiment of the invention. The following descriptions and the drawings are basically restricted to the differences between the illustrative embodiments; as regards identically designated components, in particular as regards components having identical reference signs, reference may also in principle be made to the drawings and/or the description of the other illustrative embodiments, in particular FIGS. 1 to 8. To differentiate between the illustrative embodiments, the letter a has been appended to the reference signs of the illustrative embodiment in FIGS. 1 to 8. In the illustrative embodiments of FIGS. 9 and 10, the letter a has been replaced by the letter b.

FIG. 9 shows a detailed view of an alternative transport device 10*b* for transporting at least one product 12*b* (cf. FIG. 10), in particular for forming rows and/or groups of products 12*b*. The alternative transport device 10*b* comprises at least one guide unit 14*b*, at least one conveyor unit 16*b*, which has at least one continuous conveyor unit 18*b* mounted movably relative to the guide unit 14*b*, in particular an endless conveyor transport belt. The continuous conveyor unit 18*b* comprises at least one movably mounted conveyor element 20*b*, in particular a conveyor roller, and at least one further movably mounted conveyor element 22*b*, in particular a further conveyor roller, which are connected to each other to form the continuous conveyor unit 18*b* and are at least jointly movable relative to the guide unit 14*b*. The transport device 10*b* moreover comprises at least one conveyor drive unit 24*b* for driving the continuous conveyor unit 18*b* relative to the guide unit 14*b*, in particular for driving the continuous conveyor unit 18*b* in rotation about the guide unit 14*b*. Furthermore, the transport device 10*b* comprises at least one individual drive unit 26*b* which is provided at least to individually drive at least the at least one conveyor element 20*b* and/or the at least one further conveyor element 22*b*, in particular in addition to driving of the continuous conveyor unit 18*b* relative to the guide unit 14*b* by means of the conveyor drive unit 24*b*.

In contrast to the transport device 10*a* shown in FIGS. 1 to 8, the continuous conveyor unit 18*b* of the transport device 10*b* shown in FIGS. 9 and 10 has a multiplicity of endless conveyor belt segments 90*b*, 92*b* which are connected to each other, particularly like a chain. The conveyor belt segments 90*b*, 92*b* are preferably themselves designed as endless conveyor belts or as circular belts which can be driven in rotation by means of the at least one conveyor element 20*b* and/or the at least one further conveyor element 22*b*, particularly in addition to a rotating drive of the continuous conveyor unit 18*b*. The at least one conveyor element 20*b* and/or the at least one further conveyor element 22*b* are/is designed as drive roller(s) of one of the conveyor belt segments 90*b*, 92*b* of the continuous conveyor unit 18*b*. The individual drive unit 26*b* is preferably provided, on account of an individual drive of the at least one conveyor element 20*b* and/or of the at least one further conveyor element 22*b*, to drive the one or more conveyor belt segments 90*b*, 92*b* individually, in particular in addition to a rotating drive of the continuous conveyor unit 18*b*, which is formed by the conveyor belt segments 90*b*, 92*b*. As regards further features and functions of the transport device 10*b* shown in FIGS. 9 and 10, reference may be made to the description of the transport device 10*a* which is shown in FIGS. 1 to 8 and which is to be used at least substantially analogously to the transport device 10*b* shown in FIGS. 9 and 10.

What is claimed is:

1. A transport device for transporting product (12*a*; 12*b*), the transport device comprising
    at least one guide unit (14*a*; 14*b*),
    at least one conveyor unit (16*a*; 16*b*), which has at least one continuous conveyor unit (18*a*; 18*b*) mounted movably relative to the guide unit (14*a*; 14*b*), the at least one continuous conveyor unit (18*a*, 18*b*) configured to transport the products along a main transport direction (50*a*, 50*b*) and including at least one movably mounted conveyor element (20*a*; 20*b*) and at least one further movably mounted conveyor element (22*a*; 22*b*), wherein the conveyor elements are connected to each other to form the continuous conveyor unit (18*a*; 18*b*) and are at least jointly movable relative to the guide unit (14*a*; 14*b*),
    at least one conveyor drive unit (24*a*; 24*b*) for driving the continuous conveyor unit (18*a*; 18*b*) relative to the guide unit (14*a*; 14*b*), and
    at least one individual drive unit (26*a*; 26*b*) which is provided at least to individually drive at least the at least one conveyor element (20*a*; 20*b*) and/or the at least one further conveyor element (22*a*; 22*b*), wherein the individual drive unit (26*a*, 26*b*) includes at least one actuator (78*a*, 78*b*, 48*a*, 48*b*) for driving the at least one conveyor element (20*a*, 20*b*) and/or the at least one further conveyor element (22*a*, 22*b*) so as to adjust a spacing between the products along the main transport direction (50*a*, 50*b*), wherein the at least one conveyor element (20*a*, 20*b*) and/or the at least one further conveyor element (22*a*, 22*b*) each extend along an axis that is perpendicular to the main transport direction (50*a*, 50*b*) of the continuous conveyor unit (18*a*, 18*b*).

2. The transport device according to claim 1, characterized in that the at least one conveyor element (20a; 20b) is assigned to a conveyor group (30a; 30b) of the continuous conveyor unit (18a; 18b), and the at least one further conveyor element (22a; 22b) is assigned to a further conveyor group (32a; 32b) of the continuous conveyor unit (18a; 18b), wherein the individual drive unit (26a; 26b) is provided at least to individually drive the conveyor group (30a; 30b) and/or the further conveyor group (32a; 32b).

3. The transport device according to claim 1, characterized in that the individual drive unit (26a; 26b) has at least one form-fit and/or force-fit drive element (34a, 36a; 34b, 36b) which, in order to drive the at least one conveyor element (20a; 20b) and/or the at least one further conveyor element (22a; 22b), interacts with the at least one conveyor element (20a; 20b) and/or with the at least one further conveyor element (22a; 22b).

4. The transport device according to claim 3, characterized in that the form-fit and/or force-fit drive element (34a, 36a; 34b, 36b) is a toothed belt.

5. The transport device according to claim 3, characterized in that the individual drive unit (26a; 26b) has at least one drive element (38a, 40a, 42a, 44a; 38b, 40b, 42b, 44b) which is arranged on the at least one conveyor element (20a; 20b) or on the at least one further conveyor element (22a; 22b).

6. The transport device according to claim 5, characterized in that the at least one drive element (38a, 40a, 42a, 44a; 38b, 40b, 42b, 44b) is a toothed element, which is provided to interact with a form-fit and/or force-fit drive element (34a, 36a; 34b, 36b) of the individual drive unit (26a; 26b).

7. The transport device according to claim 1, characterized in that the individual drive unit (26a; 26b) has at least one coupling unit (46a; 46b) which is provided to move at least one drive element (38a, 40a, 42a, 44a; 38b, 40b, 42b, 44b) of the individual drive unit (26a; 26b) and/or a form-fit and/or force-fit drive element (34a, 36a; 34b, 36b) of the individual drive unit (26a; 26b) for coupling them to each other or for uncoupling them.

8. The transport device according to claim 1, characterized in that the individual drive unit (26a; 26b) is arranged at least partially on two mutually remote sides of the at least one conveyor element (20a; 20b) and/or of the at least one further conveyor element (22a; 22b).

9. The transport device at least according to claim 1, characterized in that the actuator of the individual drive unit is one of an electric motor (78a, 78b) or a magnetic drive element (48a; 48b), which interacts with the at least one conveyor element (20a; 20b) and/or with the at least one further conveyor element (22a; 22b) in order to drive the at least one conveyor element (20a; 20b) and/or the at least one further conveyor element (22a; 22b).

10. The transport device according to claim 1, characterized by at least one vacuum unit (28a; 28b) for generating an underpressure in order to draw the at least one product (12a; 12b) in a direction of the at least one conveyor element (20a; 20b) and/or the at least one further conveyor element (22a; 22b).

11. The transport device according to claim 1, characterized in that the at least one conveyor element (20a; 20b) and/or the at least one further conveyor element (22a; 22b) have/has a maximum circumferential surface extent along a direction extending transversely with respect to the main transport direction (50a; 50b) of the continuous conveyor unit (18a; 18b), which maximum circumferential surface extent corresponds at least substantially to a maximum transverse extent (54a; 54b) of the continuous conveyor unit (18a; 18b).

12. A method for transporting products (12a; 12b) along a main transport direction (50a, 50b), wherein, in at least one method step, at least one conveyor element (20a; 20b) is driven and rotated about an axis that is perpendicular to the main transport direction (50a, 50b) by means of an individual drive unit (26a; 26b) with a rotational speed and/or a rotational direction (56a, 58a; 56b, 58b) which differs from a rotational speed and/or a rotational direction (56a, 58a; 56b, 58b) of at least one further conveyor element (22a; 22b), wherein the at least one further conveyor element (22a, 22b) additionally is driven about an axis that is perpendicular to the main transport direction (50a, 50b).

13. The method according to claim 12, characterized in that, in at least one method step, the at least one conveyor element (20a; 20b) and the at least one further conveyor element (22a; 22b) are driven in opposite rotational directions (56a, 58a; 56b, 58b) by means of the individual drive unit (26a; 26b), such that a spacing between the products along the main transport direction (50a, 50b) is adjusted.

14. The method according to claim 12, characterized in that, in at least one method step, a rotational movement of the at least one conveyor element (20a; 20b) and of the at least one further conveyor element (22a; 22b), generated by means of the individual drive unit (26a; 26b), superposes a driving movement, generated by means of a conveyor drive unit (24a; 24b), of the continuous conveyor unit (18a; 18b) relative to the guide unit (14a; 14b).

15. A transport device for forming rows and/or groups of products (12a; 12b), the transport device comprising
at least one guide unit (14a; 14b),
at least one conveyor unit (16a; 16b), which has at least one continuous conveyor unit (18a; 18b) mounted movably relative to the guide unit (14a; 14b), wherein the continuous conveyor unit is an endless conveyor roller transport belt that moves the products along a main transport direction (50a, 50b), and which includes at least one movably mounted conveyor element (20a; 20b), wherein the at least one movably mounted conveyor element is a conveyor roller, and wherein the continuous conveyor unit further includes at least one further movably mounted conveyor element (22a; 22b), wherein the at least one further movably mounted conveyor element is a further conveyor roller, wherein the conveyor elements are connected to each other to form the continuous conveyor unit (18a; 18b) and are at least jointly movable relative to the guide unit (14a; 14b),
at least one conveyor drive unit (24a; 24b) for driving the continuous conveyor unit (18a; 18b) in rotation about the guide unit (14a; 14b), and
at least one individual drive unit (26a; 26b) which is provided at least to individually drive at least the at least one conveyor element (20a; 20b) and/or the at least one further conveyor element (22a; 22b), in addition to driving of the continuous conveyor unit (18a; 18b) relative to the guide unit (14a; 14b), wherein the individual drive unit (26a, 26b) includes at least one electric motor (78a, 78b) for driving the at least one conveyor element (20a, 20b) and/or the at least one further conveyor element (22a, 22b) so as to adjust a spacing between the products along the main transport direction (50a, 50b), wherein the at least one conveyor element (20a, 20b) and/or the at least one further conveyor element (22a, 22b) each extend along and rotate about an axis that is perpendicular to the main transport direction (50*a*, 50*b*) of the continuous conveyor unit (18*a*, 18*b*).

16. The transport device according to claim 5, characterized in that the at least one drive element (38*a*, 40*a*, 42*a*, 44*a*; 38*b*, 40*b*, 42*b*, 44*b*) is a toothed wheel, which is provided to interact with a form-fit and/or force-fit drive element (34*a*, 36*a*; 34*b*, 36*b*) of the individual drive unit (26*a*; 26*b*).

17. A method for forming rows and/or groups of products (12*a*; 12*b*) using a transport device according to claim 1, wherein, in at least one method step, the at least one conveyor element (20*a*; 20*b*) is driven by means of the individual drive unit (26*a*; 26*b*) with a rotational speed and/or a rotational direction (56*a*, 58*a*; 56*b*, 58*b*) which differs from a rotational speed and/or a rotational direction (56*a*, 58*a*; 56*b*, 58*b*) of the at least one further conveyor element (22*a*; 22*b*), so as to adjust the spacing between the products along the main transport direction 50*a*, 50*b*).

18. The method according to claim 17, characterized in that, in at least one method step, the at least one conveyor element (20*a*; 20*b*) and the at least one further conveyor element (22*a*; 22*b*) are driven in opposite rotational directions (56*a*, 58*a*; 56*b*, 58*b*) by means of the individual drive unit (26*a*; 26*b*).

19. The method according to claim 17, wherein, in at least one method step, a rotational movement of the at least one conveyor element (20*a*; 20*b*) and of the at least one further conveyor element (22*a*; 22*b*), generated by means of the individual drive unit (26*a*; 26*b*), superposes a driving movement, generated by means of a conveyor drive unit (24*a*; 24*b*), of the continuous conveyor unit (18*a*; 18*b*) relative to the guide unit (14*a*; 14*b*).

20. The method according to claim 12, wherein, in the at least one method step, the at least one conveyor element (20*a*; 20*b*) is driven and rotated about the axis by means of the individual drive unit (26*a*; 26*b*) with a rotational speed which differs from a rotational speed of the at least one further conveyor element (22*a*; 22*b*).

21. The method according to claim 17, wherein, in the at least one method step, the at least one conveyor element (20*a*; 20*b*) is driven and rotated about the axis by means of the individual drive unit (26*a*; 26*b*) with a rotational speed which differs from a rotational speed of at least one further conveyor element (22*a*; 22*b*).

22. The transport device according to claim 3, wherein the at least one form-fit and/or force-fit drive element (34*a*, 36*a*; 34*b*, 36*b*) is a form-fit drive element.

* * * * *